(12) United States Patent
Jeong

(10) Patent No.: US 9,852,411 B2
(45) Date of Patent: Dec. 26, 2017

(54) CARD PAYMENT APPARATUS

(71) Applicants: Hye Jin Jeong, Iksan-si (KR); Hye Ran Jeong, Iksan-si (KR)

(72) Inventor: Hye Jin Jeong, Iksan-si (KR)

(73) Assignees: Hye Jin Jeong, Iksan-si (KR); Hye Ran Jeong, Iksan-si (KR)

( * ) Notice: Subject to any disclaimer, the term of this patent is extended or adjusted under 35 U.S.C. 154(b) by 213 days.

(21) Appl. No.: 14/417,854

(22) PCT Filed: Dec. 28, 2012

(86) PCT No.: PCT/KR2012/011814
§ 371 (c)(1),
(2) Date: Jan. 28, 2015

(87) PCT Pub. No.: WO2014/104450
PCT Pub. Date: Jul. 3, 2014

(65) Prior Publication Data
US 2015/0294290 A1    Oct. 15, 2015

(30) Foreign Application Priority Data
Dec. 26, 2012  (KR) .................. 10-2012-0153622

(51) Int. Cl.
G06Q 20/34  (2012.01)
G06Q 20/20  (2012.01)
G07F 7/08  (2006.01)
G06Q 20/32  (2012.01)
G06Q 20/40  (2012.01)

(52) U.S. Cl.
CPC ......... *G06Q 20/204* (2013.01); *G06Q 20/322* (2013.01); *G06Q 20/3278* (2013.01); *G06Q 20/34* (2013.01); *G06Q 20/401* (2013.01); *G07F 7/0873* (2013.01); *G07F 7/0893* (2013.01)

(58) Field of Classification Search
None
See application file for complete search history.

(56) References Cited

U.S. PATENT DOCUMENTS

| | | | |
|---|---|---|---|
| 4,861,971 A * | 8/1989 | Chan | G06Q 20/127 235/381 |
| 2004/0127256 A1* | 7/2004 | Goldthwaite | G06K 7/0004 455/558 |
| 2007/0228164 A1* | 10/2007 | Lu | G06F 13/385 235/441 |
| 2011/0084131 A1* | 4/2011 | McKelvey | G06Q 20/32 235/379 |

FOREIGN PATENT DOCUMENTS

| | | |
|---|---|---|
| KR | 10-2005-0019527 | 3/2005 |
| KR | 10-2008-0026802 | 3/2008 |
| KR | 10-2011-0054251 | 5/2011 |
| KR | 10-1143856 | 5/2012 |
| KR | 10-1178246 | 9/2012 |

\* cited by examiner

*Primary Examiner* — Paul Danneman
(74) *Attorney, Agent, or Firm* — Maier & Maier, PLLC

(57) ABSTRACT

Disclosed is a card payment apparatus. An aspect of the present invention is directed to provide a card payment apparatus, which is accessed to a portable communication apparatus or a computer without a card terminal, and then, performs a payment process by using a contactless card or a contact card.

7 Claims, 4 Drawing Sheets

CARD PAYMENT APPARATUS

CROSS-REFERENCE TO RELATED APPLICATIONS

This application claims the benefit of the Korean Patent Application No. 10-2012-0153622 filed on Dec. 26, 2012, which is hereby incorporated by reference as if fully set forth herein.

BACKGROUND

Field of the Invention

The present invention relates to a card payment apparatus, and more particularly, to a card payment apparatus which is accessed to a portable communication apparatus or a computer without a card terminal, and then, processes payment by using a contactless card or a contact card.

Discussion of the Related Art

Generally, a contactless card such as a transportation card or the like as well as a contact card such as a magnetic card or the like is widely used as a payment means such as a credit card or the like.

A contactless card is a contactless-wireless identification card which has a size similar to a size of a credit card which accommodates RF electronic chips and a loop antenna.

Most of consumers use a contactless card such as a credit card.

A card payment instrument processes payment for a certain amount by using processes. The processes include extracting information of a payment instrument from a card medium, generating an electronic payment request including payment means information, payment information, and member store information, transferring them to a card company server through a POS terminal, and receiving an electronic payment request.

After a user gives a credit card to a clerk in a store, the clerk inputs price of goods into a POS terminal, the user who confirms the price signs, and a payment is approved, the card payment instrument installed in the store issues a receipt Examples of a receipt which is issued after a credit card payment includes a receipt for a customer and a receipt for a collection. Therefore, in consideration of resource utilization of paper and ink which are used for manufacturing a receipt, because the entire quantity of them is imported, a tremendous loss to the nation occurs.

In consideration that a lot of portable communication apparatus such as a smart phone or the like are supplied, an electronic payment using a method, in which personal card information is saved in a portable communication apparatus and the card information is transmitted for bank financial transactions or business transactions through wireless network in a type of a RF signal, is recently processed.

However, for the electronic payment, personal information including card information is has to be saved in a portable communication apparatus, which is susceptible to security, and thus, the electronic payment has security problems.

Moreover, in order for an electronic payment to be processed in a portable communication apparatus, program has to be installed, complicated processes linked to financial institution or the like has to be performed, and a plurality of processes for approval and input have to be performed, and thus, a user, who is old or has a problem in use of information technology IT instrument, does not use the electronic payment.

Moreover, an electronic payment using a portable communication apparatus is limited to a credit card payment, and in the electronic payment, a use of various types of cards such as a debit card, a cash card, a transportation card, a point card or the like is limited.

SUMMARY

Accordingly, the present invention is directed to provide a card payment apparatus that substantially obviate one or more problems due to limitations and disadvantages of the related art.

An aspect of the present invention is directed to provide a card payment apparatus, which is accessed to a portable communication apparatus or a computer without a card terminal, and then, performs a payment process by using a contactless card or a contact card.

Another aspect of the present invention is directed to provide card payment apparatus, which identifies various types of cards including a contactless card or a contact card, and then, performs a payment process.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a card payment apparatus including: a USB interface receiving a USB signal from a USB connector, which is inserted into a USB port of a terminal apparatus to be connected and inputs and outputs data; an earphone jack connecting part inserted into an earphone jack inserting groove of a portable communication apparatus to be connected; a contactless reader sensing first payment information from a contactless card in a state where the contactless card is not contacted; a contact reader sensing second payment information from a contact card in a state where the contact card is contacted; a card type decoder extracting an identifying code included in the first payment information or the second payment information and determining a type of the contact card or the contactless card, if the first payment information or the second payment information sensed from the contact card or the contactless card is decoded; and a controller transferring the first payment information or the second payment information to the terminal apparatus or the portable communication apparatus, and if a type of a card is decoded by the card type decoder, generating a program activation control signal, which performs a payment process corresponding to the type of a card, to transfer the program activation control signal to the portable communication apparatus or the terminal apparatus.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
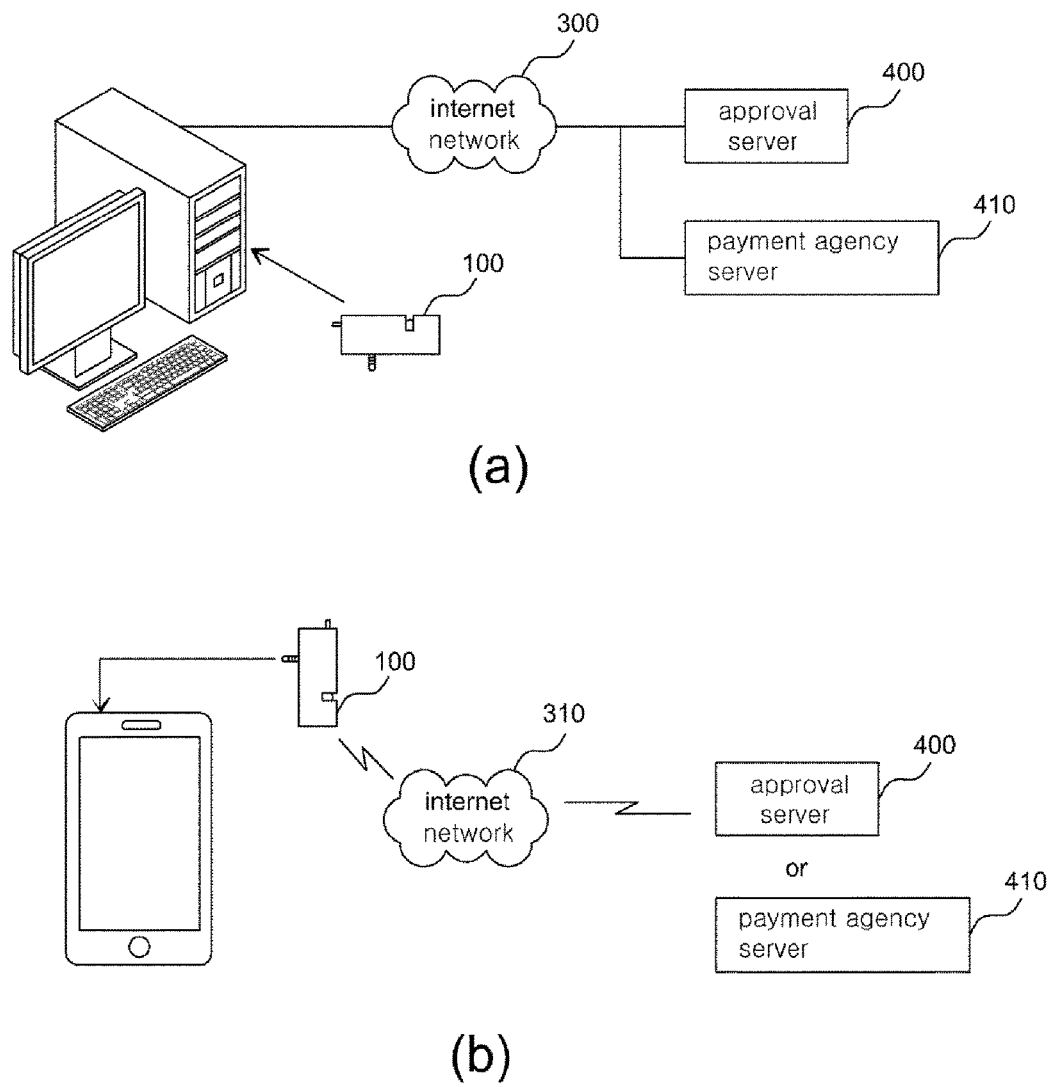
FIG. 1 is a diagram schematically illustrating a payment system using a card payment apparatus according to an embodiment of the present invention.

Hereinafter, embodiments of the present invention will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known configuration or function is determined to unnecessarily obscure the important point of the present invention, the detailed description will be omitted.

Figure 2:
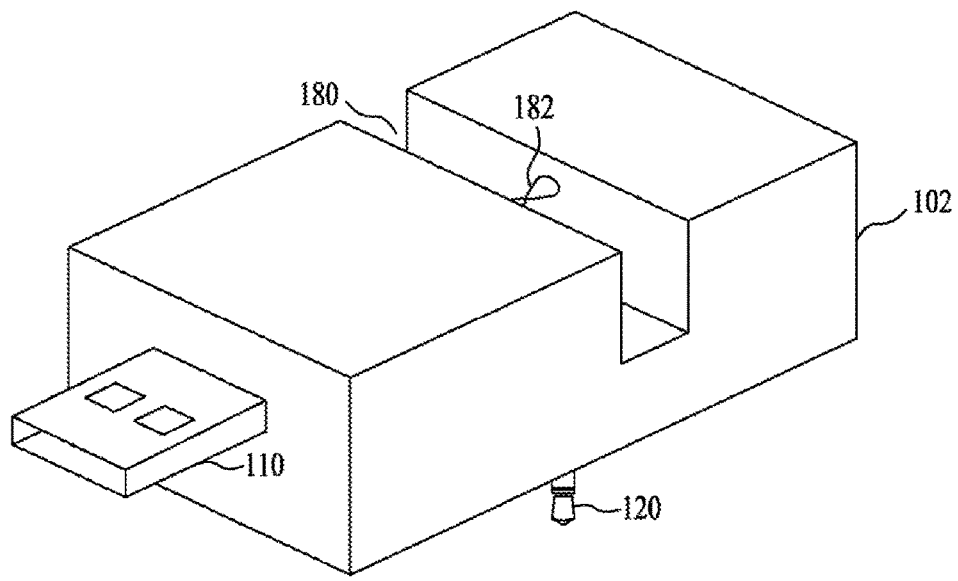
FIG. 2 is a perspective view illustrating the card payment apparatus according to an embodiment of the present invention.
Figure 3:
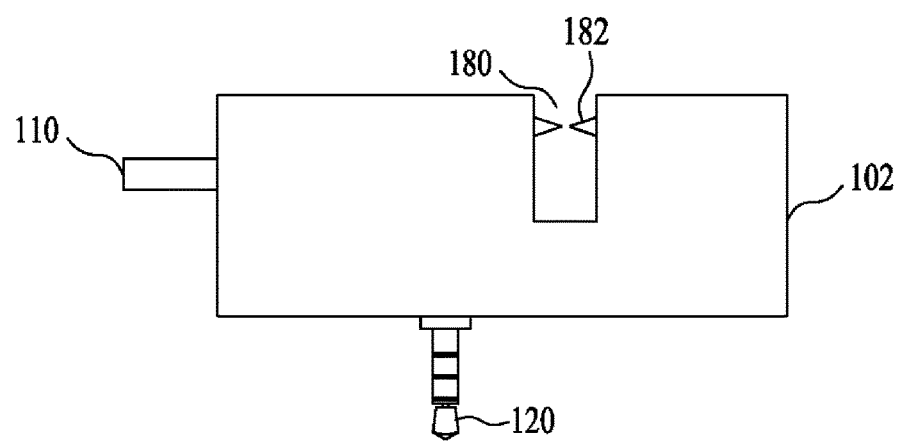
FIG. 3 is a cross-sectional view of the card payment apparatus according to an embodiment of the present invention.

FIG. 1 is a diagram schematically illustrating a payment system using a card payment apparatus according to an embodiment of the present invention, FIG. 2 is a perspective view illustrating the card payment apparatus according to an embodiment of the present invention, and FIG. 3 is a cross-sectional view of the card payment apparatus according to an embodiment of the present invention.

As shown in a portion (a) of FIG. 1, in a payment system using a card payment apparatus 100 according to an embodiment of the present invention, the card payment apparatus 100 is connected to a computer 200, and requests payment to an approval server 400 or a payment agency server 410 through an internet network 300 to processes the payment.

As shown in a portion (b) of FIG. 1, the card payment apparatus 100 according to another embodiment of the present invention is connected to a portable communication apparatus 210, and requests payment to an approval server 400 or a payment agency server 410 through a mobile network 310 to processes the payment.

As shown in FIGS. 2 and 3, the card payment apparatus 100 according to an embodiment of the present invention includes a body part 102 having a certain length and thickness, a USB connector 110 provided in a side of the body part 102, an earphone jack connecting part 120 provided in a lower surface of the body part 102, and a card inserting groove 180 which has a certain depth from one side of an upper surface of the body part 102. Here, a card is inserted into the card inserting groove 180.

The USB connector 110 and the earphone jack connecting part 120 may be provided in various positions of the body part 102.

A card is inserted into the card inserting groove 180 to be mounted onto the card inserting groove 180, and a card fixing part 182 is provided in an inside of an upper end of the card inserting groove 180.

The card fixing part 182 is fixed to the card inserting groove 180 so that the card fixing part 182 is pushed back to move when a card is inserted into the card inserting groove 180 and protrudes from the card inserting groove 180 again by an elastic force to press the inserted card to prevent the card from being extracted.

When card payment is completely processed and the card is extracted from the card inserting groove 180, the card fixing part 182 is pushed back, and thus, the pressure supplied to the card is released.

Figure 4:
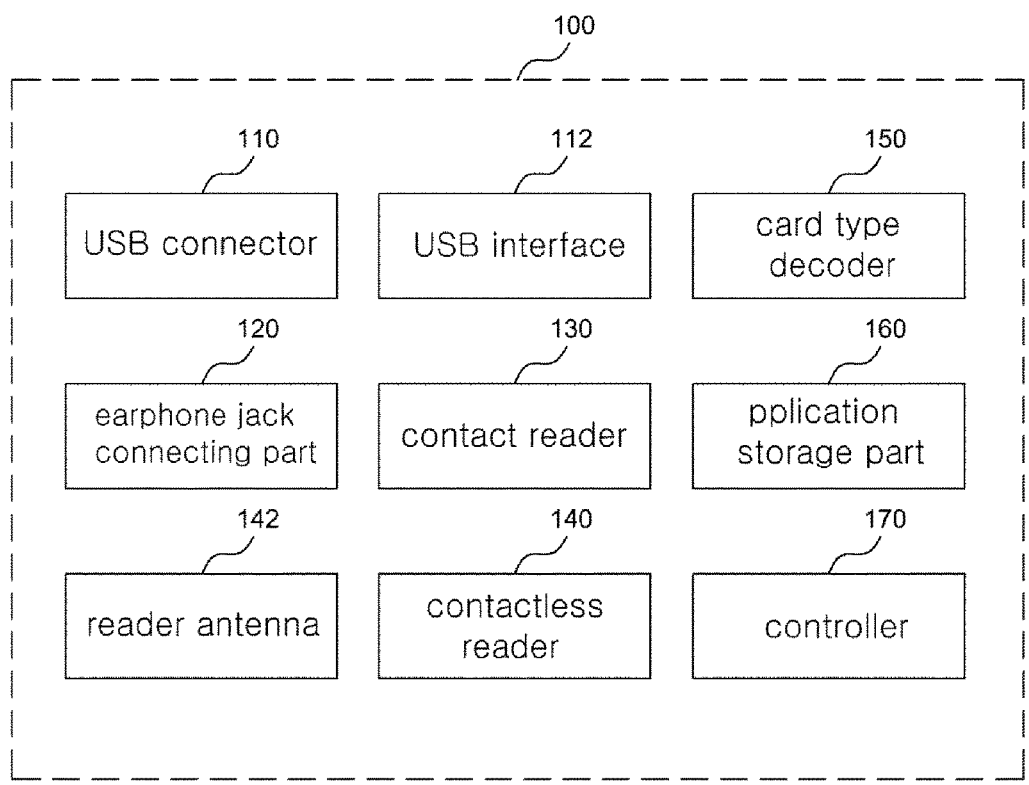
FIG. 4 is a block diagram schematically illustrating a configuration of the card payment apparatus according to an embodiment of the present invention.

FIG. 4 is a block diagram schematically illustrating a configuration of the card payment apparatus according to an embodiment of the present invention.

The card payment apparatus 100 according to an embodiment of the present invention includes a USB connector 110, a USB interface 112, an earphone jack connecting part 120, a contact reader 130, a reader antenna 142, a contactless reader 140, a card type decoder 150, an application storage part 160 and a controller 170.

The USB connector 110 is connected to a USB port of a notebook, a computer 200, and a portable communication apparatus 210 (a portable phone, PDA or the like).

The USB interface 112 receives a USB signal through the USB connector 110.

The earphone jack connecting part 120 is inserted into an earphone jack inserting groove of a portable communication apparatus 210 to be connected, and is configured with a terminal for an input and an output of a signal and a common grounding terminal, and thus, transmits and receives an analog audio signal and a digital data signal.

If the USB connector 110 and the earphone jack connecting part 120 are connected to an external apparatus, the card payment apparatus 100 converts an audio signal having a certain frequency and amplitude into constant voltage power to supply the power to the contact reader 130 and the contactless reader 140.

The card payment apparatus modulates a digital data signal to a certain frequency band, converts the digital data into an analog signal, and then, transfers the analog signal through the earphone jack connecting part 120.

Further, in the portable communication apparatus 210, a process of converting a digital data signal and a decoding process are performed.

Therefore, an analog audio signal and a digital data signal are configured to be transferred through one earphone jack connecting part 120.

The contactless reader 140 includes at least one or more reader antenna 142, which has an electrical contact with a contactless card in a contactless type by using capacitance coupling and/or electromagnetic induction or the like for transaction with a contactless card (IC card or RF card). Moreover, the contactless reader 140 supplies power to a contactless card through the reader antenna 142. Here, the reader antenna 142 outputs a current, which has a frequency of a specific band, so as to have an electrical contact with a contactless card in a contactless type. Also, the contactless card may be formed of plastic, which accommodates an antenna (generally a loop antenna configured with a coil) for receiving a current output from a reader antenna 142, and a chip saving card information. The contactless card is turn on by using a current signal received from an antenna, and transfers card information saved in a chip to the reader antenna 142.

The contactless reader 140 senses payment information of the contactless card excited by capacitance coupling and/or electromagnetic induction provided from the reader antenna 142 through the half duplex type transaction using application protocol data unit, and decodes the payment information.

The contact reader 130 includes at least one or more contact point, which forms an electrical contact with a chip on board COB provided in the contact card in a contact type. The contact reader 130 supplies power to the contact card through the contact point. The contact reader 130 senses payment information from the contact card through the half duplex type transaction using application protocol data unit, and decodes the payment information.

The payment information of the contactless card and the contact card includes at least one or more of available period information, a card issue bank, account information and an identifying code (for example, BIN or the like)

According to ISO 7811, a track of the contact card includes at least one or more track. Information of a credit card or a debit card is inputted into a first track, and information of a cash card is inputted into a second track.

A card number saved in a first track is configured with a number of sixteen ciphers. 4 to 6 numbers from the first of the card number is referred to as a bank identification number BIN. A unique number is internationally assigned to BIN for each bank and each financial institution. Therefore, it is possible to identify which financial institution issues a card, by using BIN information.

BIN of a credit card and BIN of a debit card are different from each other. A type of a card may be determined by sensing a field, which expresses a card type in BIN of a credit card and BIN of a debit card. It is equally applied to every card types.

That is, it is assumed that each of every cards include a field expressing a card type.

For example, in a front surface of a card, there is sixteen numbers. One or more of the sixteen numbers from the first denotes a type of a card. That is, there are 35 for JCB card, 36 for dynasty card, 37 for an american express card, 4× for a visa card, 51-55 for a masters card, and 9 for a domestic use card, or the like.

In the above-described description, BIN is described for identifying a card type, but the present invention is not limited thereto. Therefore, a debit card, a cash card, a transportation card, a point card, a credit card or the like may be identified by using a special identifying code.

Moreover, it is assumed that a special identifying code (BIN, etc.) is saved in a contactless card for identifying a card type by using the same method used in a contact card.

If the card type decoder 150 decodes payment information from the contact reader 130 or the contactless reader 140, the card type decoder 150 extracts an identifying code included in the payment information, and the card type decoder 150 determines effectiveness of the identifying code by determining whether the identifying code is available information configured according to a rule or not.

If the identifying code is available information, the card type decoder 150 determines that a card sensed by using a contact method or a contactless method is one of a credit card, a debit card, a cash card, a transportation card and a point card. Here, the above-described card types are described for convenience of a description, and thus, the present invention includes various card types other than the above-described card types.

The card type decoder 150 provided in the card payment apparatus 100 is described above, but the present invention is not limited thereto, and thus, the card type decoder 150 may be provided in a computer 200 or a portable communication apparatus 210.

A client program corresponding to a type of a card such as a credit card, a debit card, a cash card, a transportation card and a point card is saved in the application storage part 160.

The application storage part 160 provided in the card payment apparatus 100 is described above, but the present invention is not limited thereto, and thus, the application storage part 160 may be provided in a computer 200 or a portable communication apparatus 210.

When the USB connector 110 or the earphone jack connecting part 120 is connected to a computer 200 or a portable communication apparatus 210, the controller 170 recognizes the connected apparatus as a hard disk, and thus, transfers the client program saved in the application storage part 160 to the computer 200 or the portable communication apparatus 210.

When a computer 200 or a portable communication apparatus 210 is connected to the card payment apparatus 100, the computer 200 or the portable communication apparatus 210 downloads the client program and automatically executes the client program.

The client program includes at least one or more payment application, which performs a payment process corresponding to payment information.

The payment application transfers a payment information request signal to an approval server 400 to process the payment.

The approval server 400 may be a card company server or a bank server, which receives the payment information request signal to transfer a payment approval result. The approval server 400 may transfer the payment information request signal to a member store, a company, etc. through a payment relay server or a payment agency server 410.

A portable communication apparatus 210 is connected to the earphone jack connecting part 120 or the USB connector 110, and particularly, a portable phone is connected to the earphone jack connecting part 120, and a personal computer PC is connected to the USB connector 110.

If a type of a card is decoded by the card type decoder 150, the controller 170 generates a program activation control signal corresponding to the type of the card, and transfers the program activation control signal to an apparatus connected to the card payment apparatus 100.

A difference in a payment method occurs between a credit card, a debit card, a cash card, a transportation card and a point card.

For example, a credit card is connected to a card company server through a payment agency server 410, and thus, electronic payment is processed. Also, a debit card is connected to a bank server, and thus electronic payment is processed. That is, according to the present invention, a payment method is changed according to a type of a card.

The program activation control signal denotes a control signal, which activates an application program performing a payment process of the corresponding card, according to a type of a card.

If an apparatus connected to the card payment apparatus 100 receives the program activation control signal in a state where the client program is executed, the apparatus activates one of a plurality of payment applications to perform a payment process.

The controller 170 transfers a signal such as a program activation control signal to a computer 200 or a portable communication apparatus 210 through the USB connector 110 or the earphone jack connecting part 120 in a state where a client program is installed or saved in a computer 200 or a portable communication apparatus 210. The client program processes a corresponding signal.

If a payment approval is received and payment is completely processed, the controller 170 issues an electronic receipt in connection with the payment, and transfers the electronic receipt to a computer 200, a portable communication apparatus 210, etc. Then, the controller controls the computer 200 or the portable communication apparatus 210 to print the receipt through a printer.

Therefore, the present invention may process payment according to purchase of goods without limit in a place, and may transfer an electronic receipt including payment information to user's terminal.

Moreover, according to the present invention, resource waste according to issue of a paper receipt does not occur, and a receipt may be archived in a computer or a portable communication apparatus semipermanently.

Figure 5:
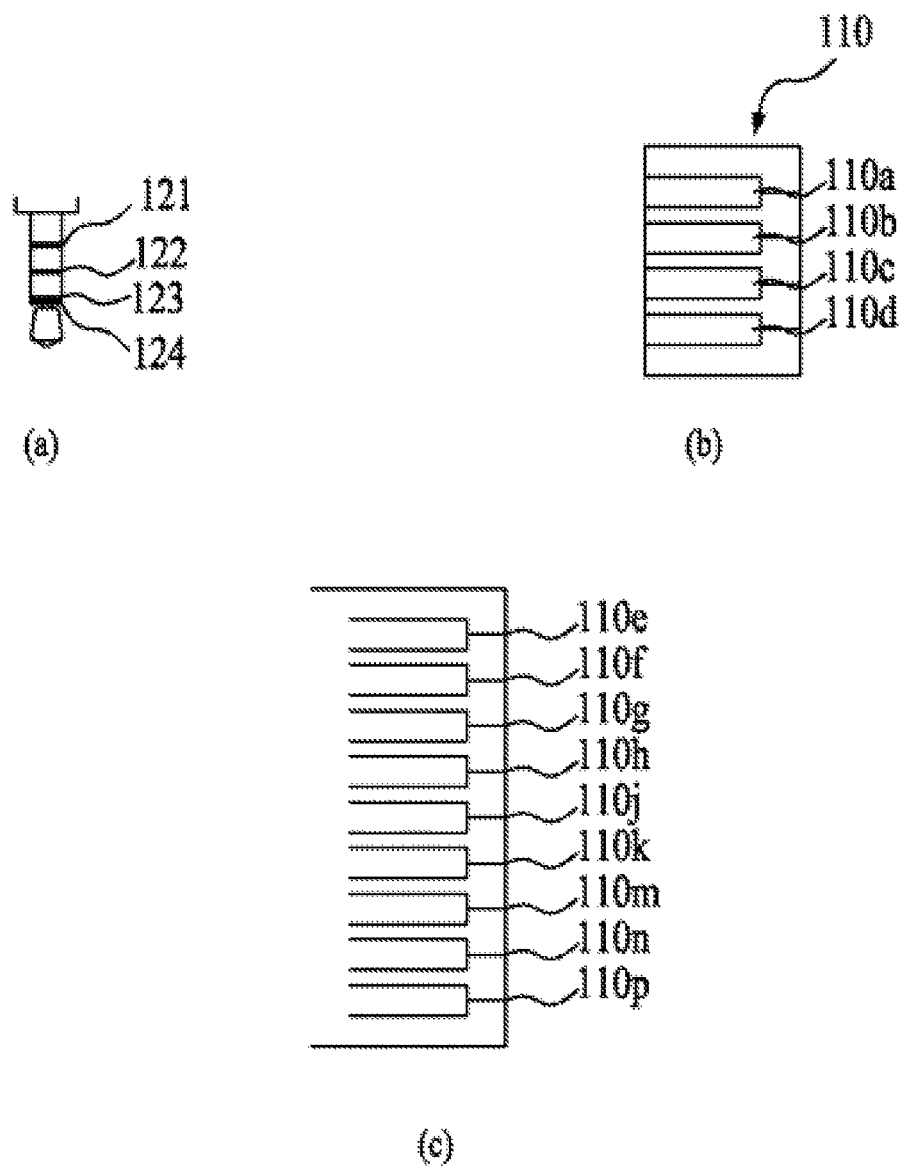
FIG. 5 is a diagram illustrating a configuration of a USB connector and an earphone jack connector applied to the card payment apparatus according to an embodiment of the present invention.

FIG. 5 is a diagram illustrating a configuration of a USB connector and an earphone jack connector applied to the card payment apparatus according to an embodiment of the present invention.

The USB connector 110 applied to an embodiment of the present invention, as shown in a portion (b) of FIG. 5, includes a power pin 110a for a power signal, data pins 110b and 110c for transmitting/receiving data signals D+ and D−, and a grounding pin 110d for a grounding signal.

The USB connector 100 applied to another embodiment of the present invention, as shown in a portion (c) of FIG. 5, is a card type connector and is connected to an apparatus having a USB interface connector.

The USB connector 110 matches the power signal, the data signals and the grounding signals to nine pins 110e, 110f, 110g, 110h, 110j, 110k, 110m, 110n and 110p.

For example, the power signal is matched to a fifth pin 110j, the grounding signals are matched to a fourth pin 110h and a seventh pin 110m, and the data signals are matched to two pins among first to third pins 110e, 110f and 110g, a sixth pin 110k, a eighth pin 110n and a ninth pin 110p. The USB connector 110 has the standards compatible with a secure digital SD card.

As another example of a card type connector, the USB connector 110 has the standards compatible with a memory stick configured with a ten number of pins.

For example, the power signal is matched to a second pin and a eighth pin, the grounding signals are matched to a first pin and a tenth pin, and the data signals are matched to two or more pins among a third to a seventh pins and a ninth pin.

The earphone jack connecting part 120 applied to an embodiment of the present invention is a four-electrode jack, which includes a grounding terminal 121, audio terminals 122 and 123 transferring two audio signals, and a microphone terminal 124 for inputting data into a portable communication apparatus 210.

If the earphone jack connecting part 120 is connected to a portable communication apparatus 210 or the USB connector 112 is connected to a computer 200, when the controller receives a token signal from a portable communication apparatus 210 or a computer 200, the controller 170 is changed to a transmitting mode and generates a data transmitting start signal to transmit the data transmitting start signal to the apparatus transmitting the token signal.

When a portable communication apparatus 210 or a computer 200 receives the data transmitting start signal from the earphone jack connecting part 120 or the USB connector 112, the portable communication apparatus 210 or the computer 200 is changed to a receiving mode to demodulate a data bit stream by an asynchronous protocol or a synchronous protocol to save it in the storage part.

The card payment apparatus 100 according to the present invention is connected to a computer 200 and a portable communication apparatus 210 by using the USB connector 110 or the earphone jack connecting part 120, but, the present invention is not limited thereto. Therefore, a near field communication module may be provided in each of the card payment apparatus 100, the computer 200 and the portable communication apparatus 210.

In other words, each of the card payment apparatus 100, the computer 200 and the portable communication apparatus 210 may be configured with a near field communication module, and transmit and receive the payment information and the control signal by using a near field communication, such as bluetooth, infrared wireless communication IrDA, shared wireless access protocol SWAP, etc. within a certain distance (for example, 10 to 100 m, etc.).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

According to the present invention, various types of card including a contactless card or a contact card may be identified in a portable phone, a personal computer PC or the like, and thus, a payment may be processed.

The card payment apparatus of the present invention may process payment according to purchase of goods without limit in a place, and may transfer an electronic receipt including payment information to user's terminal.

According to the present invention, resource waste according to issue of a paper receipt does not occur, and a receipt may be archived in a computer or a portable communication apparatus semipermanently.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A card payment apparatus comprising:
  a USB interface receiving a USB signal from a USB connector, which is inserted into a USB port of a terminal apparatus to be connected and inputs and outputs data;
  an earphone jack connecting part inserted into an earphone jack inserting groove of a portable communication apparatus to be connected;
  a contactless reader sensing first payment information from a contactless card in a state where the contactless card is not contacted;
  a contact reader sensing second payment information from a contact card in a state where the contact card is contacted;
  a card type decoder extracting an identifying code included in the first payment information or the second payment information and determining a type of the contact card or the contactless card, if the first payment information or the second payment information sensed from the contact card or the contactless card is decoded;

a controller transferring the first payment information or the second payment information to the terminal apparatus or the portable communication apparatus, and if a type of a card is decoded by the card type decoder, generating a program activation control signal, which performs a payment process corresponding to the type of a card, to transfer the program activation control signal to the portable communication apparatus or the terminal apparatus;

a near field communication module transmitting and receiving at least one of the first and the second payment information and the program activation control signal with at least one of the terminal apparatus and the portable communication apparatus by using a near field communication; and an application storage part, in which a client program including a plurality of payment applications performing a payment process corresponding to the first payment information or the second payment information is saved, wherein, when the portable communication apparatus or the terminal apparatus is connected to the USB connector or the earphone jack connecting part, the portable communication apparatus or the terminal apparatus downloads the client program saved in the application storage part and automatically executes the client program, and if the program activation control signal is received in a state where the client program is executed, the portable communication apparatus or the terminal apparatus activates one payment application corresponding to the program activation control signal among the payment applications to perform a payment process, and wherein, in at least one of cases that the earphone jack connecting part is connected to the portable communication apparatus, the USB connector is connected to the terminal apparatus or the near field communication module is connected to at least one of the terminal apparatus and the portable communication apparatus by using the near field communication, the controller is changed to a transmitting mode and generates a data transmitting start signal to transmit the data transmitting start signal to at least one of the portable communication apparatus or the terminal apparatus from which the controller receives a token signal.

2. The card payment apparatus of claim 1, wherein the earphone jack connecting part is inserted into an earphone jack inserting groove of the portable communication apparatus to be connected, and transmits and receives an analog audio signal and a digital data signal through one terminal.

3. The card payment apparatus of claim 1, further comprising:
a body part having a certain length and thickness;
the USB connector provided in a side of the body part;
an earphone jack connecting part provided in a lower surface of the body part; and
a card inserting groove having a certain depth from one side of an upper surface of the body part, a card being inserted into the card inserting groove.

4. The card payment apparatus of claim 3, further comprises a card fixing part, which is provided in an inside of an upper end of the card inserting groove, is pushed back to move with a button manner when a card is inserted into the card inserting groove, protrudes again by an elastic force to press the inserted card to prevent the card from being extracted without a user's extraction, and the card fixing part is pushed back again when the card is extracted by the user from the card inserting groove.

5. The card payment apparatus of claim 1, wherein the USB connector comprises a power pin for a power signal, data pins for transmitting/receiving data signals D+ and D−, and a grounding pin for a grounding signal, and the earphone jack connecting part comprises a grounding terminal, audio terminals transferring two audio signals, and a microphone terminal for inputting data into the portable communication apparatus.

6. The card payment apparatus of claim 1, wherein the USB connector comprises a power pin for a power signal, data pins for transmitting/receiving data signals D+ and D−, and a grounding pin for a grounding signal, the USB connector is a card type plug, which comprises nine pins and is compatible with a secure digital SD card, or is a card type plug, which comprises ten pins and is compatible with a memory stick, at least one pin is used for a power signal, at least one pin is used for a grounding signal, at least one pin is used for D+ signal, and at least one pin is used for D− signal, among the nine pins or the ten pins, and the earphone jack connecting part comprises a grounding terminal, audio terminal transferring two audio signals, and a microphone terminal for inputting data into the portable communication apparatus.

7. The card payment apparatus of claim 1, wherein
the contact card or the contactless card accommodates bank identification number BIN, to which a unique number is assigned for each bank and each financial institution, for sensing a type of a card, the card type decoder determines a type of a card by sensing a field, which expresses a card type, in BIN, and the controller generates the program activation control signal, by which a payment method is changed according to a type of a card, to transfer the program activation control signal to the portable communication apparatus or the terminal apparatus.

* * * * *